(12) United States Patent
Hetzler et al.

(10) Patent No.: US 7,533,325 B2
(45) Date of Patent: May 12, 2009

(54) ANAMORPHIC CODES

(75) Inventors: Steven Robert Hetzler, Los Altos, CA (US); Daniel Felix Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 10/619,641

(22) Filed: Jul. 14, 2003

(65) Prior Publication Data

US 2005/0015656 A1    Jan. 20, 2005

(51) Int. Cl.
*H03M 13/00* (2006.01)

(52) U.S. Cl. .......................... 714/777; 714/784; 714/6; 714/766; 714/770

(58) Field of Classification Search ................. 714/784, 714/5–6, 766, 770, 777

See application file for complete search history.

(56) References Cited

U.S. PATENT DOCUMENTS

| | | | |
|---|---|---|---|
| 5,134,619 A * | 7/1992 | Henson et al. .............. 714/770 |
| 5,148,432 A | 9/1992 | Gordon et al. |
| 5,257,391 A | 10/1993 | DuLac et al. |
| 5,301,297 A | 4/1994 | Menon et al. |
| 5,398,253 A | 3/1995 | Gordon |
| 5,485,571 A | 1/1996 | Menon |
| 5,506,977 A | 4/1996 | Jones |
| 5,579,475 A | 11/1996 | Blaum et al. |
| 5,835,938 A | 11/1998 | Yamamoto et al. |
| 5,848,229 A | 12/1998 | Morita |
| 5,937,428 A | 8/1999 | Jantz |
| 6,070,249 A | 5/2000 | Lee |
| 6,138,125 A | 10/2000 | DeMoss |
| 6,154,853 A | 11/2000 | Kedem |
| 6,161,165 A | 12/2000 | Solomon et al. |
| 6,269,453 B1 | 7/2001 | Krantz |
| 6,275,898 B1 | 8/2001 | DeKoning |
| 6,279,138 B1 | 8/2001 | Jadav et al. |
| 6,353,895 B1 | 3/2002 | Stephenson |

(Continued)

FOREIGN PATENT DOCUMENTS

EP    0518603 A2    12/1992

OTHER PUBLICATIONS

G.A. Alvarez et al., Tolerating Multiple Failures in RAID Architectures with Optimal Storage and Uniform Declustering, Computer Architecture News (USA), V. 25, #2, pp. 62-72, May 1972.

(Continued)

*Primary Examiner*—Guy J Lamarre
(74) *Attorney, Agent, or Firm*—Joseph P. Curtin, L.L.C.

(57) ABSTRACT

The error tolerance of an array of m storage units is increased by using a technique referred to as "dodging." A plurality of k stripes are stored across the array of storage units in which each stripe has n+r elements that correspond to a symmetric code having a minimum Hamming distance $d=r+1$. Each respective element of a stripe is stored on a different storage unit. An element is selected when a difference between a minimum distance of the donor stripe and a minimum distance of a recipient stripe is greater or equal to 2. The selected element is also stored on a storage unit having no elements of the recipient stripe. A lost element of the recipient stripe is then rebuilt on the selected element.

70 Claims, 6 Drawing Sheets

U.S. PATENT DOCUMENTS

| | | |
|---|---|---|
| 6,530,004 B1 | 3/2003 | King et al. |
| 7,346,831 B1 * | 3/2008 | Corbett .................... 714/770 |
| 2002/0035667 A1 | 3/2002 | Bruning, III et al. |

OTHER PUBLICATIONS

V. Bohossian et al., Computing in the RAIN: A Reliable Array of Independent Nodes, pp. 1-20, Sep. 24, 1999.

P.M. Chen et al., RAID: High-Performance, Reliable Secondary Storage, ACM Computing Surveys, vol. 26, No. 2, pp. 146-185, Jun. 1994.

M. Holland et al., Parity Declustering for Continuous Operation in Redundant Disk Arrays, ACM 0-89791-535-6/92/0010/0023, pp. 23-35, Oct. 1992.

N.K. Ouchi, Two-Level DASD Failure Recovery Method, IBM Technical Disclosure Bulletin, vol. 36, No. 03, pp. 187-190, Mar. 1993.

D.A. Patterson et al., A Case for Redundant Arrays of Inexpensive Disks (RAID), ACM 0-89791-268-3/88/0006/0109 1998.

J.S. Plank, A Tutorial on Reed-Solomon Coding for Fault-Tolerance in RAID-like Systems, pp. 1-19, Feb. 19, 1999.

E.J. Schwabe et al., Evaluating Approximately Balanced Parity-Declustered Data Layouts for Disk Arrays, ACM 0-89791-813-4/96/05, pp. 41-54, 1996.

E.J. Schwabe et al., Flexible Usage of Parity Storage Space in Disk Arrays, ACM 0-89791-809-6/96/06, pp. 99-108, 1996.

L. Xu et al., X-Code: MDS Array Codes with Optimal Encoding, IEEE Trans. On Information Theory, vol. 45, No. 1, pp. 272-276, Jan. 1999.

M. Blaum et al., "MDS Array Codes with Independent Parity Symbols," IEEE Trans. on Information Theory, vol. IT-42, pp. 529 542, Mar. 1996.

M. Blaum et al., "The Evenodd Code and its Generalization," High Performance Mass Storage and Parallel I/O: Technologies and Applications, edited by H. Jin et al., IEEE & Wiley Press, New York, Chapter 14, pp. 187 208, 2001.

M. Blaum et al ., "Evenodd: An Efficient Scheme For Tolerating Double Disk Failures In A RAID Architecture," IEEE Trans. on Computers, vol. 44, No. 2, pp. 192-202, Feb. 1995.

M. Holland et al., Parity Declustering for Continuous Operation in Redundant Disk Arrays, ACM 0-89791-535-6/92/0010/0023, pp. 23-35, Oct. 1992.

First Office Action in corresponding Chinese patent application, Nov. 30, 2007.

Office Action in EP 04 766 140.0—1225 corresponding to present patent application, Nov. 21, 2007, 3 pages.

* cited by examiner

| | D1 | D2 | D3 | D4 | D5 | D6 |
|---|---|---|---|---|---|---|
| | 1 | 1 | 1 | 1 | 2 | 2 |
| | 2 | 2 | 3 | 3 | 3 | 3 |

| | D1 | D2 | D3 | D4 | D5 | D6 | D7 | D8 | D9 |
|---|---|---|---|---|---|---|---|---|---|
| | 1 | 1 | 1 | 1 | 1 | 1 | 2 | 2 | 2 |
| | 2 | 2 | 2 | 3 | 3 | 3 | 3 | 3 | 3 |

| | D1 | D2 | D3 | D4 | D5 | D6 | D7 | D8 | D9 |
|---|---|---|---|---|---|---|---|---|---|
| | ⊠ | 1 | 1 | ⊠ | 1 | 1 | ⊠ | 2 | 2 |
| | ⊠ | 2 | 2 | ⊠ | 3 | 3 | ⊠ | 3 | 3 |

| | D1 | D2 | D3 | D4 | D5 | D6 | D7 | D8 | D9 |
|---|---|---|---|---|---|---|---|---|---|
| | ⊠ | ⊠ | 1 | ⊠ | 1 | 1 | 2 | 2 | 2 |
| | ⊠ | ⊠ | 2 | ⊠ | 3 | 3 | 3 | 3 | 3 |

FIG. 6

| | D1 | D2 | D3 | D4 | D5 | D6 | D7 | D8 | D9 |
|---|---|---|---|---|---|---|---|---|---|
| | ✕ | ✕ | 1 | 1 | 1 | 1 | ✕ | 2 | 2 |
| | ✕ | ✕ | 2 | 3 | 3 | 3 | ✕ | 3 | <u>1</u> |

| | D1 | D2 | D3 | D4 | D5 | D6 | D7 | D8 | D9 |
|---|---|---|---|---|---|---|---|---|---|
| | ✕ | ✕ | ✕ | 1 | 1 | 1 | 2 | 2 | 2 |
| | ✕ | ✕ | ✕ | 3 | 3 | 3 | 3 | 3 | 3 |

| | D1 | D2 | D3 | D4 | D5 | D6 | D7 | D8 | D9 |
|---|---|---|---|---|---|---|---|---|---|
| | ✕ | ✕ | ✕ | 1 | 1 | 1 | 2 | 2 | 2 |
| | ✕ | ✕ | ✕ | <u>2</u> | 3 | 3 | 3 | 3 | <u>1</u> |

| D1 | D2 | D3 | D4 | D5 | D6 | D7 | D8 |
|---|---|---|---|---|---|---|---|
| 1 | 1 | 1 | 1 | 1 | 1 | 2 | 2 |
| 2 | 2 | 2 | 2 | 3 | 3 | 3 | 3 |
| 3 | 3 | 4 | 4 | 4 | 4 | 4 | 4 |

ARRAY 1001

| D1 | D2 | D3 | D4 | D5 | D6 | D7 | D8 |
|----|----|----|----|----|----|----|----|
| ✕1 | ✕1 | 1 | 1 | 1 | 1 | 2 | 2 |
| ✕2 | ✕2 | 2 | 2 | 3 | 3 | 3 | 3 |
| ✕3 | ✕3 | 4 | 4 | 4 | 4 | 4 | 4 |

ARRAY 1002

| D9 | D10 | D11 | D12 | D13 | D14 | D15 | D16 |
|----|-----|-----|-----|-----|-----|-----|-----|
| ✕5 | 5 | 5 | 5 | 5 | 5 | 6 | 6 |
| ✕6 | 6 | 6 | 6 | 7 | 7 | 7 | 7 |
| ✕7 | 7 | 8 | 8 | 8 | 8 | 8 | 8 |

ARRAY 1003

| D17 | D18 | D19 | D20 | D21 | D22 | D23 | D24 |
|-----|-----|-----|-----|-----|-----|-----|-----|
| ✕9 | 9 | 9 | 9 | 9 | 9 | 10 | 10 |
| ✕10 | 10 | 10 | 10 | 11 | 11 | 11 | 11 |
| ✕11 | 11 | 12 | 12 | 12 | 12 | 12 | 12 |

FIG. 10

| | D1 | D2 | D3 | D4 | D5 | D6 | D7 | D8 | D9 | D10 |
|---|---|---|---|---|---|---|---|---|---|---|
| | ⊠1 | ⊠1 | 1 | ⊠1 | 1 | 1 | 2 | 2 | 2 | 2 |
| | ⊠2 | ⊠2 | 3 | ⊠3 | 3 | 3 | 3 | 3 | 4 | 4 |
| | ⊠4 | ⊠4 | 4 | ⊠4 | 5 | 5 | 5 | 4 | 5 | 1 |

FIG. 12

ANAMORPHIC CODES

CROSS-REFERENCE TO RELATED APPLICATIONS

The present application is related to patent application Ser. No. 10/619,649, entitled "Automatic Parity Exchanges," now U.S. Pat. No. 7,281,177 B2 to Hetzler et al., patent application Ser. No. 10/619,633, entitled "Multi-path Data Retrieval From Redundant Array," now U.S. Pat. No. 7,379,974 B2 to Hetzler et al., and patent application Ser. No. 10/619,648, entitled "RAID 3+3," now U.S. Pat. No. 7,254,754 B2 to Hetzler et al., each copending, co-assigned and filed concurrently herewith, and each incorporated by reference herein. The present application is also related to co-pending and coassigned patent application Ser. No. 10/600,593, entitled "Method For Constructing Erasure Correcting Codes Whose Implementation Requires Only Exclusive ORS," now U.S. Pat. No. 7,350,126 B2 to Winograd et al., which is also incorporated by reference herein.

BACKGROUND OF THE INVENTION

1. Field of the Invention

The present invention relates to storage systems. In particular, the present invention relates to a method for configuring an array of storage units for increasing the number of storage-unit failures that the array can tolerate without loss of data stored on the array.

2. Description of the Related Art

The following definitions are used herein and are offered for purposes of illustration and not limitation:

An "element" is a block of data on a storage unit.

A "base array" is a set of elements that comprise an array unit for an ECC.

An "array" is a set of storage units that holds one or more base arrays.

A "stripe" is a base array within an array.

n is the number of data units in the base array.

r is the number of redundant units in the base array.

m is the number of storage units in the array.

d is the minimum Hamming distance of the base array.

D is the minimum Hamming distance of the array.

In a conventional array, the number of storage units in the array equals the number of data units in a base array plus the number of redundant units in the base array. That is, $m=n+r$. Most conventional storage arrays use a Maximum Distance Separation (MDS) code, such as parity, or a mirroring technique for tolerating failures. The minimum Hamming distance of the base array using an MDS code equals one plus the number of redundant units in the base array (i.e., $d=1+r$). For a mirror configuration, the number of redundant units in the base array equals the number of data units in the base array ($r=n=1$), and the minimum Hamming distance is $d=2$.

It is possible to anamorphically encode an array over m storage units, which is greater than the number of data units n in the array plus the number of redundant units r in the array, that is, $m>n+r$. In the literature, when an anamorphical encoding is used for arranging parity blocks for performance, such an encoding is typically referred to "de-clustering parity." As used herein, such an encoding scheme is referred to as an anamorphic encoding scheme because it more accurately identifies that the encoding scheme can provide new properties for an array.

Anamorphism is achieved by selectively arranging a set of base arrays within an array. For example, consider the exemplary array 200 shown in FIG. 2 that uses a four-element code. Array 200 includes six storage units D1-D6 depicted in a columnar form. For array 200, $m=6$. Array 200 also includes several base arrays that are each formed from n data units plus r redundant units. That is, for each base array, $n+r=4$. The respective base arrays are numbered sequentially as stripes 1-3 in FIG. 2 to indicate that the four-element code of array 200 is spread across storage units D1-D6. There are four blocks in each stripe and each stripe acts as an independent base array. The minimum distance of the array is, accordingly, the minimum of all the minimum Hamming distances of the respective stripes, that is, $D=\min(d_i)$, where $D_i$ is the minimum distance of stripe i.

As configured, anamorphic array 200 can tolerate the loss of at least r storage units of a set of m storage units without loss of data, instead of exactly r units from a set of n storage units. Thus, if $r=2$ and the code used is MDS, then any two storage units can fail without loss of data. A stripe will fail if any three of its elements are lost. There are, however, some combinations of three-unit failures that can be tolerated by anamorphic array 200. For example, if storage units D1, D3 and D5 each fail, two elements of stripe 1, two elements of stripe 2 and two elements of stripe 3 are lost, but no stripe has lost three elements. Anamorphic array 200 is, thus, over-specified and may be advantageously exploited.

What is needed is a technique that enhances the minimum Hamming distance of an ECC when it is used with an anamorphic array of storage units, and thereby increases the effective minimum distance of the array.

BRIEF SUMMARY OF THE INVENTION

The present invention provides a technique that enhances the minimum Hamming distance of an ECC that is used with an anamorphic array of storage units, thereby increasing the minimum distance of the array.

J The advantages of the present invention are provided by a first embodiment that is a method and a system for increasing an error tolerance of an anamorphic array of m storage units in which k stripes are stored across the array of m storage units. Each stripe has n+r elements that correspond to a symmetric code having a minimum Hamming distance $d=r+1$ and in which n is a number of data storage units in a base array of the array of m storage units and r is a number of redundant units in the base array. Additionally, $n=r$, $n \geq 2$, $m>n+r$, $jm=k(n+r)$, and j and k are integers. Each respective element of a stripe is stored on a different storage unit. An element is selected when a difference between a minimum distance of a donor stripe and a minimum distance of a recipient stripe is greater or equal to 2. The selected element is rebuilt on a storage unit having no elements of the recipient stripe. Before the lost element is rebuilt, the storage units storing the donor stripe are made aware that the selected element has been donated so that data is not read from or written to the selected element as part of the donor stripe. A lost element of the recipient stripe is then rebuilt on the selected element. According to the present invention, the minimum Hamming distance of the recipient stripe is $d \geq 1$ before the element in the donor stripe is selected. The selected element of donor stripe can be further selected based on a minimal performance impact on the array. Additionally, the recipient information is selected based on an improved performance of the array. The array of the storage system includes redundancy based on an erasure or error correcting code, such as a parity code, a Winograd code, a symmetric code, a Reed-Solomon code, an EVENODD code, or a derivative of an EVENODD code. Alternatively, the array includes redundancy based on a product of a plurality of erasure or error correcting codes in which at least one of the erasure or error correcting codes is a parity code, a Winograd code, a symmetric code, a Reed-Solomon code, an EVENODD code, or a derivative of an EVENODD code.

When an element in the donor stripe fails during the step of rebuilding at least a portion of recipient information from the recipient stripe on the selected element, the step of rebuilding at least a portion of recipient information from the recipient stripe on the selected element is terminated. A second donor stripe is selected from the plurality of stripes when a difference between a minimum distance of the second donor stripe and a minimum distance of the second recipient stripe is greater or equal to 2. A donor element is selected in the second donor stripe. At least a portion of lost recipient information from the recipient stripe is rebuilt on the selected element in the second donor stripe. When a spare element becomes available, the spare element is assigned to a selected storage unit.

A second embodiment of the present invention provides a method and a system for increasing the failure tolerance of an array of m storage units that is vulnerable to selected patterns of failures. According to this embodiment of the present invention, k stripes are stored across the array of m storage units. The array of m storage units is an anamorphic array. Each stripe has n+r elements in which n is the number data elements in the base array, r is the number of redundant elements in the base array, m>n+r, jm=k(n+r), and j and k are integers. Each stripe has a plurality of elements, and each stripe forms an erasure or error correcting code having a minimum Hamming distance d. Each respective element of a stripe is stored on a different storage unit. Subsequent to an element failure, a recipient element is selected. An element in a donor stripe is selected such that a failure tolerance of the array is increased following a rebuild operation. A lost element of the recipient stripe is rebuilt on the selected element of the donor stripe. The minimum Hamming distance of the recipient stripe is d≧2 before the element is selected in the donor stripe. Moreover, the minimum Hamming distance of the array is increased upon completion of rebuilding the recipient stripe on the selected element of the donor stripe. The recipient element can be selected based on a failure pattern of the array. Additionally, the donor element can be selected based on a predetermined target pattern. The storage units storing the donor stripe are made aware that the selected element has been donated before the lost element of the recipient stripe is rebuilt on the selected element. The array of storage units includes redundancy based on an erasure or error correcting code, such as a parity code, a Winograd code, a symmetric code, a Reed-Solomon code, an EVENODD code or a derivative of an EVENODD code. Alternatively, the array of storage units includes redundancy based on a product of a plurality of erasure or error correcting codes, such that at least one of the erasure or error correcting codes is a parity code, a Winograd code, a symmetric code, a Reed-Solomon code, an EVENODD code or a derivative of an EVENODD code.

A third embodiment of the present invention provides a method and a system for increasing an error tolerance of a storage system having a plurality of arrays of storage units, such that each array includes m storage units and k stripes are stored across each respective array of m storage units. Each stripe has n+r elements corresponding to a symmetric code having a minimum Hamming distance d and in which n is a number of storage units in a base array of the array of m storage units and r is a number of redundant units in the base array. Additionally, n=r, n≧2, m>n+r, jm=k(n+r), and j and k are integers. Each respective element of a stripe is stored on a different storage unit in the array. An element is selected in a donor stripe when a difference between a minimum distance of the donor stripe and a minimum distance of a recipient stripe is greater or equal to 2. The selected element is stored on a storage unit having no elements of the recipient stripe. The donor stripe can be stored on an array that is different from the array of the recipient stripe. Alternatively, the donor stripe can be stored on the same array as the recipient stripe. Before the lost element is rebuilt, the storage units storing the donor stripe are made aware that the selected element has been donated so that data is not read from or written to the selected element as part of the donor stripe. A lost element of the recipient stripe is then rebuilt on the selected element. According to the present invention, the preferred minimum Hamming distance of the recipient stripe is d≧2 before the element in the donor stripe is selected. The selected element of donor stripe can be further selected based on a minimal performance impact on the donor stripe or based on a minimal performance impact on the storage system. Additionally, the recipient information is selected based on an improved performance of the recipient stripe or based on an improved performance of the storage system. The array of the storage system includes redundancy based on an erasure or error correcting code, such as a parity code, a Winograd code, a symmetric code, a Reed-Solomon code, an EVENODD code, or a derivative of an EVENODD code. Alternatively, the array includes redundancy based on a product of a plurality of erasure or error correcting codes in which at least one of the erasure or error correcting codes is a parity code, a Winograd code, a symmetric code, a Reed-Solomon code, an EVENODD code, or a derivative of an EVENODD code.

BRIEF DESCRIPTION OF THE DRAWINGS

The present invention is illustrated by way of example and not by limitation in the accompanying figures in which like reference numerals indicate similar elements and in which:

FIG. 2 depicts an exemplary anamorphic array having six storage units;

FIG. 3 depicts an exemplary anamorphic array having nine storage units for illustrating the benefits of a dodging operation according to the present invention;

FIG. 4 depicts a first three-storage-unit-failure arrangement of the anamorphic array depicted in FIG. 3;

FIG. 5 depicts a second three-storage-unit-failure arrangement of the anamorphic array depicted in FIG. 3;

FIG. 6 depicts the array of FIG. 5 after performing a dodging operation according to the present invention;

FIG. 7 depicts a third three-storage-unit-failure arrangement of the anamorphic array depicted in FIG. 3;

FIG. 8 depicts the array of FIG. 7 after performing a dodging operation according to the present invention;

FIG. 9 depicts an exemplary array having eight storage units using a (3+3) symmetric code;

FIG. 10 depicts a system having three eight-storage-unit arrays;

FIG. 12 depicts a ten storage unit array with three failed storage units following a set of dodging operations.

DETAILED DESCRIPTION OF THE INVENTION

The minimum number of failures of an array that can be tolerated by an Erasure or Error Correcting Code (ECC), such as a parity code, a Winograd code, a symmetric code, a Reed-Solomon code, an EVENODD code, or a derivative of an EVENODD code, is at least the minimum Hamming distance d of the ECC minus one, that is, d−1. The present invention enhances the minimum Hamming distance of an ECC by utilizing an operation, referred to herein as a "dodging" operation, for providing an "effective distance" that is greater than the Hamming distance of the ECC. Thus, the number of failures that an array can tolerate, whether a failure is a device failure or a hard error, is increased beyond the minimum distance provided by the ECC. As used herein, the terms "effective distance" and "effective minimum distance" refer to one plus the number of failures that can be tolerated by an array utilizing one or more dodging operations according to the present invention.

According to the present invention, a dodging operation is a process in which a stripe within an array is selected for donating an element to a recipient stripe, and recipient information is rebuilt onto the donated element, thereby increasing the minimum distance of the array. A dodging operation can be performed on a pair of stripes (i,j) when the distance $d_i > d_j + 2$. After the dodging operation, the donor stripe will drop in distance by 1. In contrast, the recipient stripe will increase in distance by 1. When a dodging operation can be performed on all stripes that are at the minimum array distance, then the overall minimum array distance will be increased. A dodging operation can occur at varying distances depending on the configuration of the array.

Figure 1A:
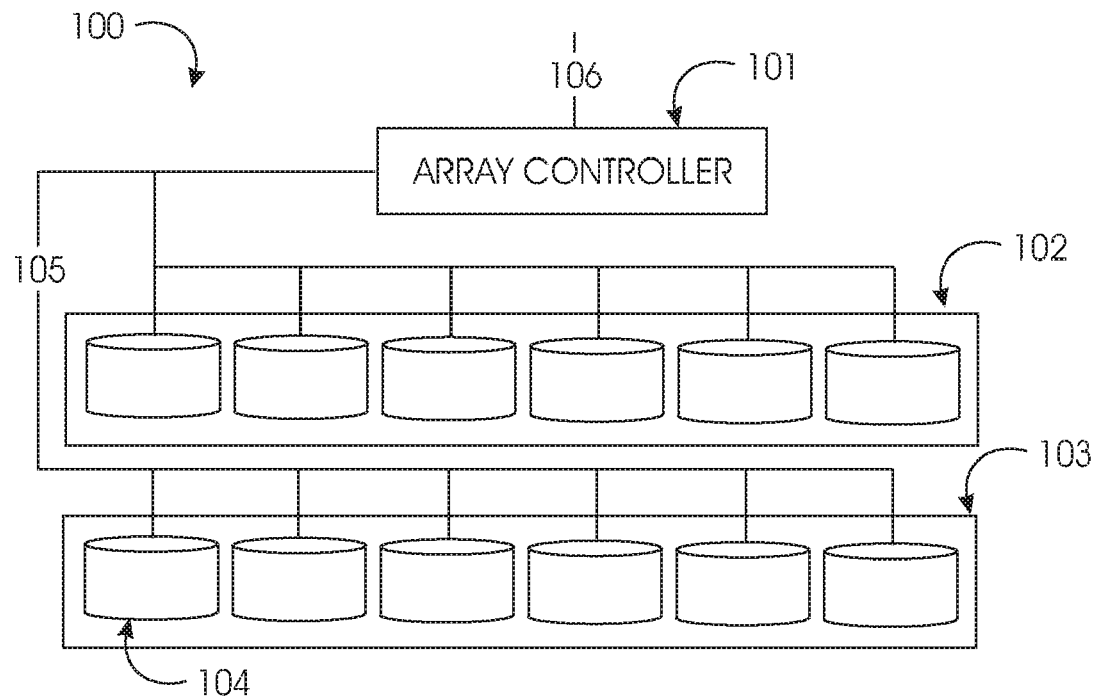
FIG. 1a shows a typical configuration of a storage system with a plurality of arrays connected to a common storage controller.

FIG. 1a shows an exemplary storage system, indicated generally as 100, comprising two storage arrays 102 and 103 that are connected to a common array controller 101. Storage arrays 102 and 103 comprise multiple storage units 104 and communicate with array controller 101 over interface 105. Array controller 101 communicates to other controllers and host systems over interface 106. Such a configuration allows an array controller to communicate with multiple storage arrays.

Figure 1B:
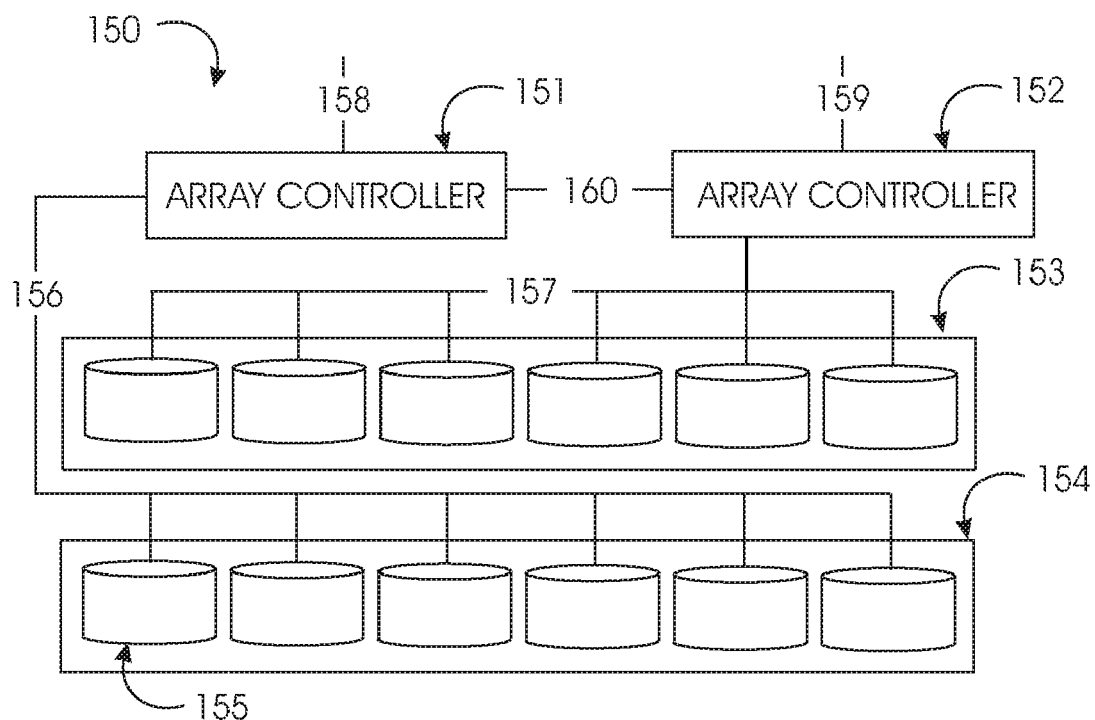
FIG. 1b shows a typical configuration of a storage system with a plurality of arrays connected to separate storage controllers.

FIG. 1b shows an exemplary storage system, indicated generally as 150, comprising two storage arrays 153 and 154, that are respectively connected to different array controllers 152 and 151. Storage array 153 communicates with array controller 152 over interface 157, and storage array 154 communicates with array controller 151 over interface 156. Array controllers 151 and 152 respectively communicate with other array controllers and storage systems over interfaces 158 and 159. Also shown in FIG. 1b is a communication connection 160 that allows array controllers 151 and 152 to communicate with each other.

The array controllers shown in FIGS. 1a and 1b may be designed as hardware or software controllers. The term controller will be used herein generally to refer to any of the configurations described above.

Many anamorphic arrays can benefit from dodging. The ability of an anamorphic array to benefit from a dodging operation can be verified by inspection of failure combinations for the array. For example, FIG. 3 shows an exemplary anamorphic array 300 having nine storage units D1-D9. For this example, array 300 uses a (3+3) symmetric code that is MDS with n=3, r=3, and d=4. Array 300 is arranged to have three redundant elements that can correct any three failed elements from the six elements in a stripe. Three unique stripes, respectively indicated as 1, 2 and 3, are arranged within array 300. Any three storage-unit failures will not affect more than three elements of any one stripe. Thus, array 300 has a minimum distance D=4.

To illustrate that a dodging operation according to the present invention can be performed to increase the effective minimum distance of array 300, there are only three arrangements of three-storage-unit failures that need consideration. The first three-storage-unit-failure arrangement is shown in FIG. 4, in which an X within a block indicates a storage-unit failure. In this particular failure arrangement, two blocks of each stripe 1-3 have failed. Consequently, each stripe still has a minimum distance d=2 and, therefore, array 300 has a minimum distance D=2. Thus, array 300, as shown in FIG. 4, can tolerate one further storage-unit failure without possible data loss.

A second three-storage-unit-failure arrangement is shown in FIG. 5 in which an X within a block indicates a storage-unit failure. In the second three-storage-unit-failure arrangement, stripe 1 has lost three elements, stripe 2 has lost two elements and stripe 3 has lost one element. Thus, stripe 1 has minimum distance d=1 and can tolerate no further storage-unit failures without data loss. Stripe 2 has minimum distance d=2, and stripe 3 has minimum distance d=3. Consequently, array 300 has minimum distance D=1.

A dodging operation can be performed for the second three-storage-unit-failure arrangement by rebuilding the contents of one of the lost elements in stripe 1 in a well-known manner onto one of the non-failed elements of stripe 3. FIG. 6 depicts the array of FIG. 5 after performing a dodging operation. Rebuilt data in FIG. 6 is underlined. Here, the element of stripe 3 on unit D9 has been donated to stripe 1. Following the dodging operation, all stripes have minimum distance d=2 and, therefore, array 300 has minimum distance D=2. The configuration of the array after the dodging operation can now tolerate one further failure without data being lost.

A third three-storage-unit-failure arrangement is shown in FIG. 7 in which an X in a block indicates a storage-unit failure. In the third three-storage-unit-failure arrangement, stripes 1 and 2 have each lost three elements, and have minimum distance d=1. Stripe 3, however, has not lost any elements and, consequently, has minimum d=4. A dodging operation can be performed for the third three-storage-unit-failure arrangement by rebuilding the contents of one lost element from each of stripes 1 and 2 (d=1) in a well-known manner onto different elements of stripe 3 (d=4). For example, the contents of element 1 on storage unit D1 can be rebuilt onto element 3 of disk D9, and the contents of element 2 on disk D1 rebuilt onto element 3 of disk D4.

FIG. 8 depicts the array of FIG. 7 after a dodging operation is performed. Rebuilt data in FIG. 8 is underlined. The result will again be that all stripes have minimum distance d=2 and, consequently, array 300 has minimum distance D=2. After the dodging operation, it is important that no storage unit contains two elements from the same stripe. That is, none of the elements of stripe 3 stored on storage units D4-D6 are selected for rebuilding any of the lost elements of stripe 1 because each of storage units D4-D6 already contain an element of stripe 1. Similarly, none of the elements of stripe 3 stored on storage units D7-D9 are selected for rebuilding any of the lost elements of stripe 2.

Dodging thus provides a technique to restore the minimum distance of array 300 of FIG. 3 from D=1 to D=2 after any three storage-unit failures. Moreover, the effective minimum distance of array 300 has been increased from d=4 to d=5, even though the system of array 300 still has the write performance of a code having distance d=4.

The smallest anamorphic array for a (3+3) code in which the effective distance is increased is an array of nine storage units. All arrays that are larger than nine storage units will also have the property of an increased effective distance when a (3+3) code is used. An array of eight storage units for a (3+3) code does not have the property of having an increased effective distance. A (4+4) code utilized over twelve storage units also has the property of an increased effective distance. A dodging operation, however, should occur when the minimum array distance is d=2. Consequently, a further storage-unit failure during the dodging operation can be tolerated.

According to the invention, a dodging operation can be performed within an array, between separate arrays, or between an array and a spare pool, referred to herein as an external dodging operation. While a dodging operation performed to a spare pool is possible, usually it is better to perform a complete rebuild operation onto a spare and to perform a dodging operation only when the spare pool is exhausted. This is because a dodging operation rebuilds only some elements from a failed storage unit onto a donated storage unit, while a sparing operation rebuilds all of the elements from a failed storage unit onto a spare storage unit.

An external dodging operation is different from a parity-exchange operation, such as disclosed by application Ser. No. 10/619,649, now U.S. Pat. No. 7,281,177 B2 to Hetzler et al., and which is incorporated by reference herein. That is, a dodging operation is performed on a stripe basis, while a parity-exchange operation is performed on a storage unit basis.

To illustrate the advantages provided by an external (array-to-array) dodging operation according to the present invention, consider an exemplary array 900 shown in FIG. 9. Array 900 includes eight storage units D1-D8 and uses a (3+3) symmetric code. Array 900 also includes four stripes, indicated by the numerals 1-4. Each stripe has six elements and has distance d=4. As previously mentioned, a dodging operation that is internal to an array of eight storage units that uses a (3+3) code, such as array 900, does not increase the effective minimum Hamming distance of the array because there are too few remaining non-failed stripes to compensate for the number of stripes that are affected by multiple unit failures.

In contrast, consider an exemplary array system 1000, shown in FIG. 10, comprising three eight-storage-unit arrays 1001-1003. Specifically, array 1001 includes storage units D1-D8, array 1002 includes storage units D9-D16, and array 1003 includes storage units D17-D24. Each respective array 1001-1003 also includes four stripes arranged within the array. For example, array 1001 includes stripes 1-4, array 1002 includes stripes 5-8, and array 1003 includes stripes 9-12.

Suppose that after any three storage-unit failures, a parity-exchange operation, such as disclosed by application Ser. No. 10/619,649, now U.S. Pat. No. 7,281,177 B2 to Hetzler et al., is used to ensure that each array 1001-1003 has one failed storage unit. The results of a parity-exchange operation are depicted, for example, by storage units D1, D9 and D17 being shown having Xs within the blocks of the storage unit. Further suppose that a fourth storage-unit failure occurs subsequently to the parity-exchange operation. A fourth storage-unit failure is depicted, for example, by storage unit D2 in array 1001 being shown having Xs within the blocks of storage unit D2. After the fourth storage-unit failure, arrays 1001, 1002 and 1003 respectively have distances D=(2, 3, 3). It should be understood that another storage unit other than storage unit D2 could fail as the fourth storage-unit failure and a procedure that is similar to the procedure described below would be performed for increasing the effective distance of the storage system.

Stripes 1, 2 and 3 in array 1001 are now only distance d=2. A dodging operation that is internal to array 1001 will fail because at least three elements having distance d=4 are required for increasing the minimum distance of array 1001 from 2 to 3. Only stripe 4 in array 1001 has distance d=4. Nevertheless, an external dodging operation between arrays allows the minimum distance of array 1001 to be increased from 2 to 3 without changing the minimum distances of arrays 1002 and 1003. To achieve this, the contents for one of the missing elements of each of stripes 1-3 are rebuilt in a well-known manner onto elements of other stripes that are still at distance d=4, such as stripe 4 on array 1001, stripe 8 on array 1002 and stripe 12 on array 1003.

Figure 11:
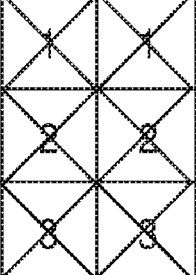
FIG. 11 depicts the array system of FIG. 10 after performing an external dodging operation according to the present invention.

FIG. 11 depicts array system 1000 of FIG. 10 after performing an external dodging operation according to the present invention. Rebuilt data in FIG. 11 is underlined. Specifically, an element of stripe 3 is selected to be rebuilt onto stripe 4 within storage unit D3. An element of stripe 2 is selected to be rebuilt onto stripe 8 within storage unit D10. Lastly an element of stripe 1 is selected to be rebuilt onto stripe 12 within storage unit D17.

When an element is selected in a donor stripe, the storage unit containing the selected element cannot contain an element of the recipient stripe. For example, an element of stripe 4 contained in either storage unit D7 or storage unit D8 can be selected for rebuilding a failed element from stripe 1 because both storage units D7 and D8 contain no elements of stripe 1. Similarly, an element of stripe 4 contained in either storage unit D5 or storage unit D6 can be selected for rebuilding a failed element from stripe 2 because both storage units D7 and D8 contain no elements of stripe 2. Lastly, an element of stripe 4 contained in either storage unit D3 or storage unit D4 can be selected for rebuilding a failed element from stripe 3 because both storage units D3 and D4 contain no elements of stripe 3. For purposes of this example, suppose that an element of stripe 4 contained in storage unit D3 is selected to be a donor element for rebuilding an element of stripe 3.

Any one of the elements of stripe 8, having d=4, could be selected for rebuilding a failed element of any one of remaining stripes, each having d=2, and any one of the elements of stripe 12, having d=4, could be selected for rebuilding a failed element of the last remaining stripe having d=2. For purposes of this illustrative example, suppose that an element of stripe 8 contained in storage unit D11 is selected to be a donor element for rebuilding an element of stripe 2, and that an element of stripe 12 contained in storage unit D19 is selected to be a donor element for rebuilding an element of stripe 1. For each of the dodging selections of this illustrative example prior to the dodging operation, a donor stripe had distance d=4, and a recipient stripe (i.e., stripes 1-3) had distance d=2.

The net result of the external dodging operation is that array system 1000 has minimum distance D=3 after four failures. In contrast, the minimum distance would have been only 2 using only a parity-exchange operation, such as disclosed by patent application Ser. No. 10/619,649, now U.S. Pat. No. 7,281,177 B2 to Hetzler et al., Consequently, when an external dodging operation is utilized for array system 1000, five failures are required for array system 1000 to have a minimum distance of d=2. This is the same result for an array system of 24 units that are arranged as four arrays of six units and in which each array uses only a parity-exchange operation as disclosed by patent application Ser. No. 10/619, 649, now U.S. Pat. No. 7,281,177 B2 to Hetzler et al. Thus, a dodging operation in combination with a parity-exchange operation provides that system reliability is independent of the array configuration.

The process of a generalized dodging operation in combination with a parity-exchange operation can continue with each further storage-unit failure. Failed elements are rebuilt onto surviving elements such that the minimum distance for each array is maximized, as described above. In the exemplary 24-unit array system of FIGS. 9 and 10, eight storage-unit failures are required for a minimum distance of d=2 for all of the arrays of the system. Once the minimum distance for each array is d=2, it is no longer possible to perform parity-exchange operations or dodging operations to increase the effective distance of the system. Consequently, two further failures can result in a data loss.

Over time, generalized dodging operations result in stripes no longer being local to a given array. Thus, the selection of a donor stripe may be realized as selecting a donor element.

Once a spare unit becomes available, such as through maintenance, it can be assigned to replace any of the failed units. It is preferred to rebuild elements of the stripes with the smallest minimum distances onto the spare unit. Consider the example of FIG. 12. Array 1200 includes ten storage units D1-D10 and uses a (3+3) symmetric code. Array 1200 also includes five stripes, indicated by the numerals 1-5. Each stripe has six elements and has distance d=4. Three storage units, D1, D2 and D4 are shown as failed, and an element of stripe 1 has been rebuilt through a dodging operation onto an element of stripe 5 on unit D 10, and an element of stripe 4 has been rebuilt through a dodging operation onto a second element of stripe 5 on unit D8. At this point, stripes 1, 2, 4 and 5 all have distance d=2, and stripe 3 has distance d=3. If a spare is subsequently made available to array 1200, information from the stripes at distance d=2 should be rebuilt onto the spare. The elements to rebuild onto the spare should be chosen from the set of elements not currently present in the stripe. For example, assume the element of stripe 1 on unit D2 was rebuilt onto unit D10, and the element of stripe 4 from unit D1 was rebuilt onto unit D8. The elements to be rebuilt onto the spare cannot include these rebuilt elements of stripes 1 and 4. Once the elements to be rebuilt have been selected, the information is rebuilt onto the spare in a well-known manner.

The primary criterion for selecting a donor element is based on selecting a donor element that has the least impact on the donor stripe reliability. A secondary criterion is based on selecting the storage element having the least impact on performance, such as the element with the most expensive redundancy calculation. In the example of FIG. 12, the elements of stripe 5 were chosen primarily because stripe 5 had the highest distance, and secondarily because D8 and D10 had the most expensive parity calculations. D9 could not be chosen for rebuilding an element of stripe 4, because D9 already contained an element of stripe 4. The primary criterion for selecting the information to be rebuilt is based on the information set that provides the greatest increase in reliability. A secondary criterion is to select the information set that provides the best array performance following the rebuild operation. In the example of FIG. 12, the elements of stripes 1 and 4 were chosen to be rebuilt primarily based on their remaining distances, and secondarily because rebuilding the chosen elements to maximize performance following the dodging operation.

There is further important effect of generalized dodging. In the example of FIGS. 9 and 10, a generalized dodging operation was performed between arrays when the recipient stripe was at distance d=2, while an internal dodging operation was performed on the nine-unit array (FIGS. 6 and 7) when the recipient stripe was at distance d=1. Thus, two failures would be required within the stripes involved in the external dodging operation for data loss during the external dodging operation.

Donating an element from a donor stripe to a recipient stripe requires that the storage system be able to assign elements from one stripe to another stripe. When the donor and recipient stripes are connected to a common array controller 101, as shown in FIG. 1a, then controller 101 can perform this operation internally. When the donor and recipient stripes are connected to separate controllers 151 and 152, as shown in FIG. 1b, then controllers 151 and 152 exchange information. For example, the controllers could expose the individual drives over communication connection 160, such as in the manner of a Just a Bunch of Disks (JBOD) array configuration. Alternatively, the controllers could exchange information regarding the data to be read and written from the locations on the storage units involved.

The technique of dodging has been described for anamorphic arrays. Dodging can be used with array types having a minimum distance d=3 or more. Generalized dodging, though, works best with symmetric arrays.

Dodging can be used beyond simply increasing the minimum distance of a storage system. Many other factors may be included in determining whether to perform dodging and to choose donors and recipients. For example, the individual failure probabilities of components when they are non-uniform, the combinations of failures that lead to data loss, and the effects on system performance may all be considered. In such cases, the minimum distance of the system could remain unchanged following dodging.

While the present invention has been described in terms of storage arrays formed from HDD storage units, the present invention is applicable to storage systems formed from arrays of other memory devices, such as Random Access Memory (RAM) storage devices (both volatile and non-volatile), optical storage devices, and tape storage devices. Additionally, it is suitable to virtualized storage systems, such as arrays built out of network-attached storage. It is further applicable to any redundant system in which there is some state information that associates a redundant component to particular subset of components, and that state information may be transferred using a donation operation.

Although the foregoing invention has been described in some detail for purposes of clarity of understanding, it will be apparent that certain changes and modifications may be practiced that is within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for increasing an error tolerance of an array of m storage units in which m is an integer, comprising:

storing k stripes across the array of m storage units in which k is an integer, each stripe comprising n+r elements in which n is the number of data elements in the stripe and r is the number of redundant elements in the stripe, m>n+r, jm=k(n+r), and j is an integer, each stripe forming a correcting code, the correcting code being one of an erasure correcting code having a minimum Hamming distance d and an error correcting code having a minimum Hamming distance d, and each respective element of a stripe being stored on a different storage unit;

selecting an element in a donor stripe when a difference between a minimum distance of the donor stripe and a minimum distance of a recipient stripe of the k stripes is greater or equal to 2 and when an element of the recipient stripe has been lost, the donor stripe and the recipient stripe being from the k stripes, the selected element being stored on a storage unit comprising no elements of the recipient stripe; and increasing the minimum distance of the recipient stripe by rebuilding the lost element of the recipient stripe on the selected element of the donor stripe so that the recipient stripe can tolerate a loss of another element without loss of data.

2. The method according to claim 1, wherein the minimum Hamming distance of the recipient stripe is d>2 before selecting the element in the donor stripe.

3. The method according to claim 1, further comprising indicating to the storage units storing the donor stripe that the selected element has been donated before rebuilding the lost element of the recipient stripe on the selected element.

4. The method according to claim 1, wherein the storage units comprise hard disk drives.

5. The method according to claim 1, wherein the storage units comprise RAM storage devices.

6. The method according to claim 1, wherein the donor stripe is further selected based on a minimal performance impact on the array.

7. The method according to claim 1, further comprising selecting the recipient information based on an improved performance of the array.

8. The method according to claim 1, wherein the correcting code comprises a parity code.

9. The method according to claim 1, wherein the correcting code comprises a Winograd code.

10. The method according to claim 1, wherein the correcting code comprises a symmetric code.

11. The method according to claim 1, wherein the correcting code comprises a Reed-Solomon code.

12. The method according to claim 1, wherein the correcting code comprises an EVENODD code.

13. The method according to claim 1, wherein the correcting code comprises a derivative of an EVENODD code.

14. The method according to claim 1, wherein the array comprises redundancy based on a product of a plurality of correcting codes.

15. The method according to claim 14, wherein at least one of the correcting codes comprises a parity code.

16. The method according to claim 14, wherein at least one of the correcting codes comprises a Winograd code.

17. The method according to claim 14, wherein at least one of the correcting codes comprises a symmetric code.

18. The method according to claim 14, wherein at least one of the correcting codes comprises a Reed-Solomon code.

19. The method according to claim 14, wherein at least one of the correcting codes comprises an EVENODD code.

20. The method according to claim 14, wherein at least one of the correcting codes comprises a derivative of an EVENODD code.

21. The method according to claim 1, wherein when an element in the donor stripe fails during rebuilding at least a portion of recipient information from the recipient stripe on the selected element, the method further comprising:

terminating rebuilding at least a portion of recipient information from the recipient stripe on the selected element;

selecting a second donor stripe from the plurality of stripes when a difference between a minimum distance of the second donor stripe and a minimum distance of the second recipient stripe is greater or equal to 2;

selecting a donor element in the second donor stripe; and rebuilding at least a portion of lost recipient information from the recipient stripe on the selected element in the second donor stripe.

22. The method according to claim 1, wherein when a spare element becomes available, the method further comprising assigning the spare element to a selected storage unit.

23. A method for increasing an error tolerance of a storage system comprising a plurality of arrays of storage units, each array comprising m storage units in which m is an integer, the method comprising:

storing k stripes across each respective array of m storage units in which k is an integer, each stripe comprising n+r elements in which n is the number of data elements in the stripe and r is the number of redundant elements in the stripe, m>n+r, jm=k(n+r), and j is an integer, each stripe forming a correcting code, the correcting code being one of an error correcting code having a minimum Hamming distance d and an erasure correcting code having a minimum Hamming distance d, and each respective element of a stripe being stored on a different storage unit in the array;

selecting an element in a donor stripe when a difference between a minimum distance of the donor stripe and a minimum distance of a recipient stripe is greater or equal to 2 and when an element of the recipient stripe is lost, the donor stripe and the recipient stripe being from the k stripes, the selected element being stored on a storage unit having no elements of the recipient stripe; and increasing the minimum distance of the recipient stripe by rebuilding the lost element of the recipient stripe on the selected element of the donor stripe so that the recipient stripe can tolerate a loss of another element without loss of data.

24. The method according to claim 23, wherein the donor stripe is stored on an array that is different from the array of the recipient stripe.

25. The method according to claim 23, wherein the donor stripe is stored on the same array as the recipient stripe.

26. The method according to claim 23, wherein the minimum Hamming distance of the recipient stripe is d>2 before selecting the element in the donor stripe.

27. The method according to claim 23, further comprising indicating to the storage units storing the donor stripe that the selected element has been donated before rebuilding the lost element of the recipient stripe on the selected element.

28. The method according to claim 23, wherein the storage units comprise hard disk drives.

29. The method according to claim 23, wherein the storage units comprise RAM storage devices.

30. The method according to claim 23, wherein the selected element of the donor stripe is farther selected based on a minimal performance impact on the donor stripe.

31. The method according to claim 23, wherein the donor stripe is farther selected based on a minimal performance impact on the storage system.

32. The method according to claim 23, further comprising selecting the recipient information based on an improved performance of the recipient stripe.

33. The method according to claim 23, further comprising selecting the recipient information based on an improved performance of the storage system.

34. The method according to claim 23, wherein correcting code comprises a parity code.

35. The method according to claim 23, wherein correcting code comprises a Winograd code.

36. The method according to claim 23, wherein correcting code comprises a symmetric code.

37. The method according to claim 23, wherein correcting code comprises a Reed-Solomon code.

38. The method according to claim 23, wherein correcting code comprises an EVENODD code.

39. The method according to claim 23, wherein correcting code comprises a derivative of an EVENODD code.

40. The method according to claim 23, wherein the array comprises redundancy based on a product of a plurality of correcting codes.

41. The method according to claim 40, wherein at least one of the correcting codes comprises a parity code.

42. The method according to claim 40, wherein at least one of the correcting codes comprises a Winograd code.

43. The method according to claim 40, wherein at least one of the correcting codes comprises a symmetric code.

44. The method according to claim 40, wherein at least one of the correcting codes comprises a Reed-Solomon code.

45. The method according to claim 40, wherein at least one of the correcting codes comprises an EVENODD code.

46. The method according to claim 40, wherein at least one of the correcting codes is a derivative of an EVENODD code.

47. The method according to claim 23, wherein when an element in the donor stripe fails during rebuilding at least a portion of recipient information from the recipient stripe on the selected element, the method further comprising:
   terminating rebuilding at least a portion of recipient information from the recipient stripe on the selected element;
   selecting a second donor stripe from the plurality of stripes when a difference between a minimum distance of the second donor stripe and a minimum distance of the second recipient stripe is greater or equal to 2;
   selecting a donor element in the second donor stripe; and
   rebuilding at least a portion of lost recipient information from the recipient stripe on the selected element in the second donor stripe.

48. The method according to claim 23, wherein when a spare element becomes available, the method further comprising assigning the spare element to a selected storage unit.

49. A data storage system, comprising;
   an array of m storage units in which m is an integer, k stripes being stored across the array of m storage units in which k is an integer, each stripe comprising n+r elements in which n is the number of data elements in the stripe and r is the number of redundant elements in the stripe, m>n+r, jm=k(n+r), and j is an integer, each stripe forming a correcting code, the correcting code being at least one of an erasure correcting code having a minimum Hamming distance d and an error correcting code having a minimum Hamming distance d, and each respective element of a stripe being stored on a different storage unit; and
   a system array controller selecting an element in a donor stripe when a difference between a minimum distance of the donor stripe and a minimum distance of a recipient stripe is greater or equal to 2 and when an element of the recipient stripe is lost, the donor stripe and the recipient stripe being from the k stripes, the selected element being stored on a storage unit having no elements of the recipient stripe; the system array controller increasing the minimum distance of the recipient stripe by rebuilding the lost element of the recipient stripe on the selected element of the donor stripe so that the recipient stripe can tolerate a loss of another element without loss of data.

50. The data storage system according to claim 49, wherein the minimum Hamming distance of the recipient stripe is d>2 before the system array controller selects the element in the donor stripe.

51. The data storage system according to claim 49, wherein the system array controller indicates to the storage units storing the donor stripe that the selected element has been donated before the lost element of the recipient stripe is rebuilt on the selected element.

52. The data storage system according to claim 49, wherein the storage units comprise hard disk drives.

53. The data storage system according to claim 49, wherein the storage units comprise RAM storage devices.

54. The data storage system according to claim 49, wherein the system array controller selects the donor stripe further based on a minimal performance impact on the array.

55. The data storage system according to claim 49, wherein the system array controller selects the recipient information based on an improved performance of the array.

56. The data storage system according to claim 49, wherein the correcting code comprises a parity code.

57. The data storage system according to claim 49, wherein the correcting code comprises a Winograd code.

58. The data storage system according to claim 49, wherein the correcting code comprises a symmetric code.

59. The data storage system according to claim 49, wherein the correcting code comprises a Reed-Solomon code.

60. The data storage system according to claim 49, wherein the correcting code comprises an EVENODD code.

61. The data storage system according to claim 49, wherein the correcting code comprises a derivative of an EVENODD code.

62. The data storage system according to claim 49, wherein the array comprises redundancy based on a product of a plurality of correcting codes.

63. The data storage system according to claim 62, wherein at least one of the correcting codes comprises a parity code.

64. The data storage system according to claim 62, wherein at least one of the correcting codes comprises a Winograd code.

65. The data storage system according to claim 62, wherein at least one of the correcting codes comprises a symmetric code.

66. The data storage system according to claim 62, wherein at least one of the correcting codes comprises a Reed-Solomon code.

67. The data storage system according to claim 62, wherein at least one of the correcting codes comprises an EVENODD code.

68. The data storage system according to claim 62, wherein at least one of the correcting codes comprises a derivative of an EVENODD code.

69. The data storage system according to claim 49, wherein when an element in the donor stripe fails as the system array controller is rebuilding at least a portion of recipient information from the recipient stripe on the selected element, the system array controller terminates rebuilding the recipient information from the recipient stripe on the selected element, selects a second donor stripe from the plurality of stripes when a difference between a minimum distance of the second donor stripe and a minimum distance of the second recipient stripe is greater or equal to 2, selects a donor element in the second donor stripe, and rebuilds at least a portion of lost recipient information from the recipient stripe on the selected element in the second donor stripe.

70. The data storage system according to claim 49, wherein when a spare element becomes available, the system array controller assigns the spare element to a selected storage unit.

* * * * *